(12) United States Patent
Metz (10) Patent No.: US 6,634,139 B1
(45) Date of Patent: Oct. 21, 2003

(54) DOCK LIGHT WARNING SYSTEM

(76) Inventor: Donald Metz, c/o DL Manufacturing, Inc. 7000 Airways Park Dr., East Syracuse, NY (US) 13057

( * ) Notice: Subject to any disclaimer, the term of this patent is extended or adjusted under 35 U.S.C. 154(b) by 247 days.

(21) Appl. No.: 09/625,317

(22) Filed: Jul. 25, 2000

(51) Int. Cl.[7] ............................................. G08B 13/08
(52) U.S. Cl. ........................................................ 49/13
(58) Field of Search ...................... 49/13, 14; 340/686, 340/687, 540

(56) References Cited

U.S. PATENT DOCUMENTS

| | | | | |
|---|---|---|---|---|
| 3,824,536 A | * | 7/1974 | Cherico | 340/52 R |
| 4,692,755 A | * | 9/1987 | Hahn | 340/687 |
| 4,843,373 A | * | 6/1989 | Trickle et al. | 340/540 |
| 5,453,735 A | * | 9/1995 | Hahn | 340/687 |
| 5,574,426 A | * | 11/1996 | Shisgal et al. | 340/435 |
| 6,310,548 B1 | * | 10/2001 | Stephens et al. | 340/540 |

* cited by examiner

*Primary Examiner*—Jerry Redman
(74) *Attorney, Agent, or Firm*—Sughrue Mion, PLLC (57) ABSTRACT

A dock light warning system includes an exterior unit adapted to be mounted adjacent a loading dock door. The exterior unit is provided with a red light assembly for providing a narrow beam of red light focused on a driver's side exterior rearview mirror when the loading dock door is in the open position to warn a driver against moving the truck. A corresponding interior unit is provided with a red light assembly and a green light assembly to indicate the condition of the red light assembly and the green light assembly of the exterior unit. A photocell assembly is provided for sensing the position of the overhead door to control the switching of the red light assembly to the green light assembly and vice versa.

6 Claims, 7 Drawing Sheets

DOCK LIGHT WARNING SYSTEM

BACKGROUND OF THE INVENTION

The present invention is directed to a dock light warning system and more specifically to a red light/green light system mounted in a common housing mounted on the outer surface of the dock structure adjacent a dock door to advise a truck driver when it is safe to back up to a dock or depart from a dock.

Many systems have been utilized over the years to prevent the unauthorized movement of a truck toward and away from a loading dock to prevent injury to employees involved in the loading and unloading of the truck. Many of these systems have relied upon complicated, physical restraint structures which actually grip a portion of the truck or block the wheels of a truck to prevent the truck from unauthorized movement away from the loading dock. Such systems are extremely complicated and expensive to build and install and frequently can cause expensive damage to a truck.

Applicant's U.S. patent (U.S. Pat. No. 5,964,059) is directed to an extendible and retractable safety pole which is located in front of a truck when it is backed up to the loading dock. Thus, the truck driver will have a highly visible pole blocking his removal of the truck from the loading dock when it is in the extended position. When the loading or unloading operation of the truck is completed and the dock door is closed, the pole will automatically retract, thereby allowing the truck driver to leave. Although this system is simpler than the mechanical restraint systems, it is still somewhat expensive to install and maintain.

SUMMARY OF THE INVENTION

The present invention provides a warning system to truck drivers which is less complicated and less expensive than the prior art systems which still provides a very distinctive warning to a truck driver against moving his truck.

The present invention provides a dock light warning system wherein a red light and a green light are mounted in a common housing adjacent the door of the loading dock. When the door is closed, the green light will be on which provides a bright but diffuse green light which clearly indicates to a driver that it is safe to approach or depart from the loading dock. Once the truck is in position adjacent the loading dock in front of the door, the door of the loading dock may be opened. The opening of the door automatically changes the light from green to red. The red light is located at a height approximately equal to the average height of an outside rearview mirror on a truck adjacent the driver's side thereof. The red light emanates from the housing and provides a narrow, 5° beam spread, thereby concentrating the light directly onto the outside rearview mirror on the driver's side so as to reflect the bright red light into the face of the driver, thereby clearly warning the driver that the truck should not be moved.

The above and other objects, features and advantages of the present invention will be more apparent and more readily appreciated from the following detailed description of preferred exemplary embodiment of the present invention, taken in connection with the accompanying drawings.

DETAILED DESCRIPTION OF THE INVENTION

Figure 1:
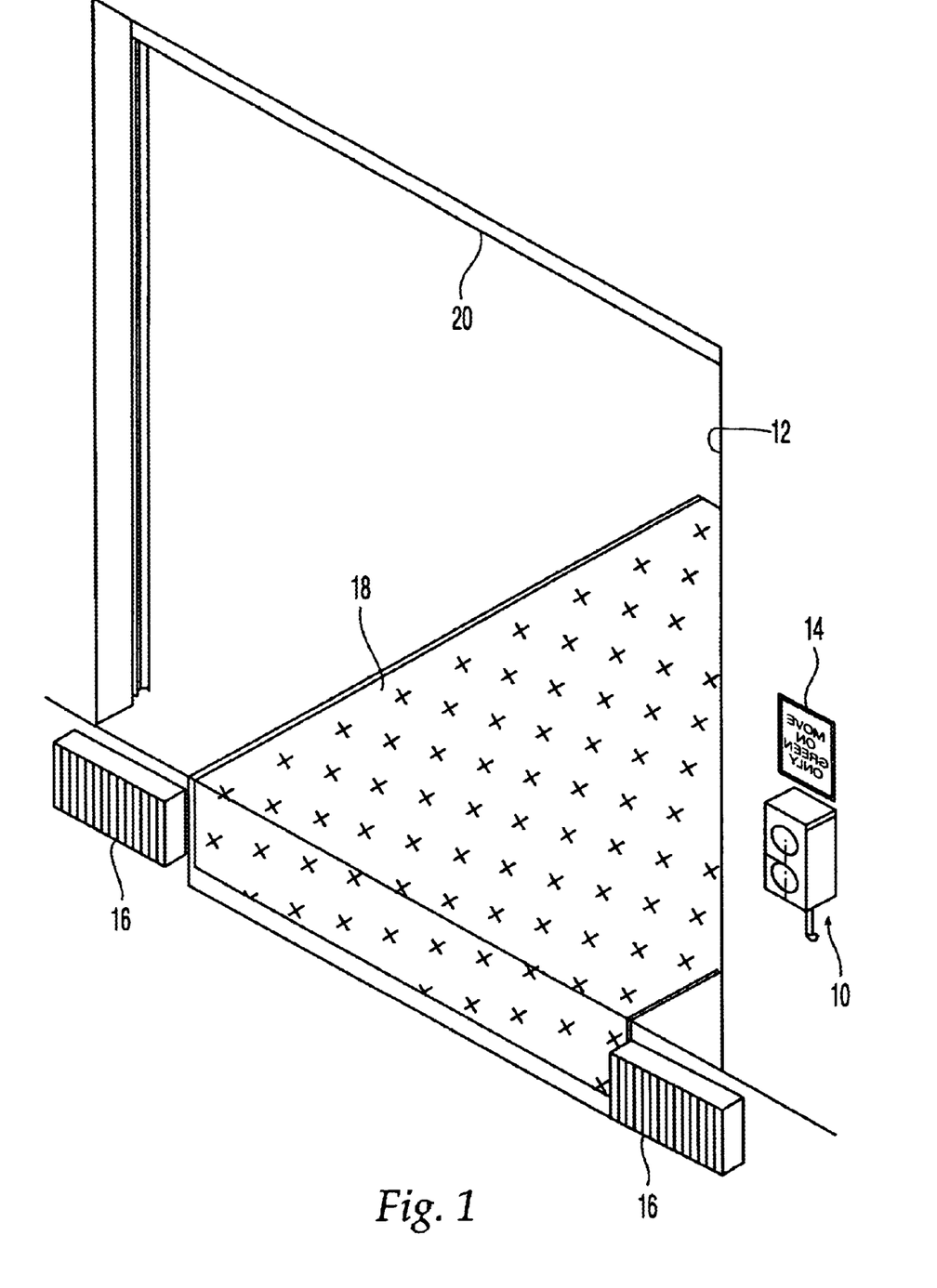
FIG. 1 is a perspective view of a loading dock with the loading door open showing the location of the exterior unit of the red light/green light warning system according to the present invention.
Figure 2:
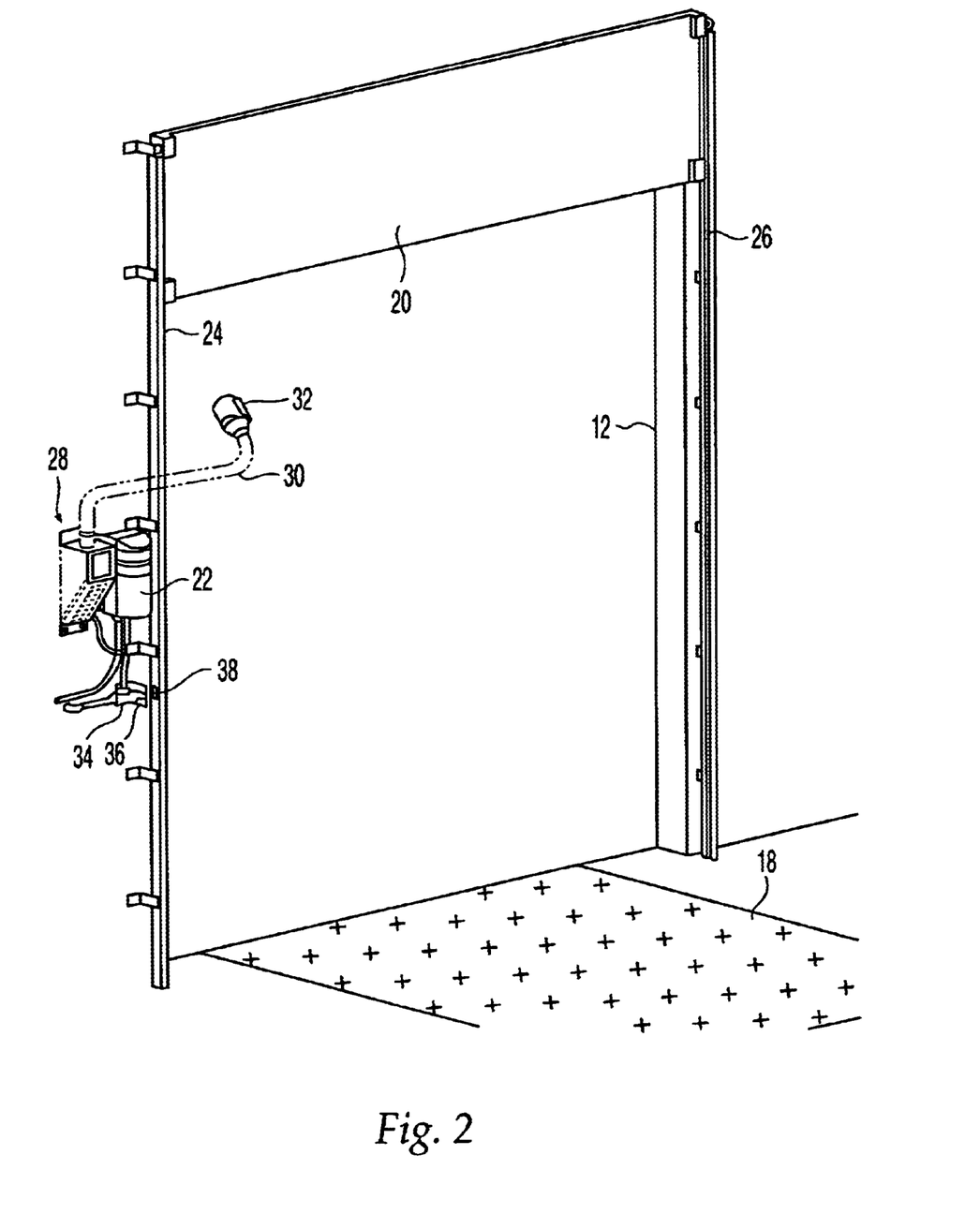
FIG. 2 is an inside view of the loading door in the raised position showing the location of the interior unit of the warning system.

The red light/green light warning unit 10 is shown in FIG. 1 as being mounted on the right hand side of a dock door opening 12 as viewed from the outside. A warning legend printed in reverse for readability in a rearview truck mirror is mounted above the warning unit 10 and reads "MOVE ON GREEN ONLY". The loading dock is provided with conventional bumpers 16 and a conventional dock leveling platform 18. The dock door 20 is usually an overhead type door which is shown in the open position in FIG. 1. FIG. 2 is an interior view of the dock door opening with the interior unit 22 of the dock light warning system mounted to the left hand side of the door opening 12 at a location approximately opposite the exterior unit 10. The overhead door 20, which is only partially illustrated in FIG. 2, is guided for movement in tracks 24 and 26, located at opposite sides of the door opening. A flexible dock light unit 28 may be mounted adjacent the interior unit 22. The dock light is provided with a flexible neck 30 which enables the ideal positioning of the light 32 for illuminating the interior of a truck backed up to the dock door opening 12. The operation of the lighting unit 28 is electrically controlled in coordination with the dock light warning system. An electric eye 34 is mounted beneath the interior unit 22 on a bracket 36 secured to the wall. The electric eye is aligned with an aperture 38 in the overhead door track 24 so as to detect when the door 20 is in the raised position and the lowered position.

Figure 3:
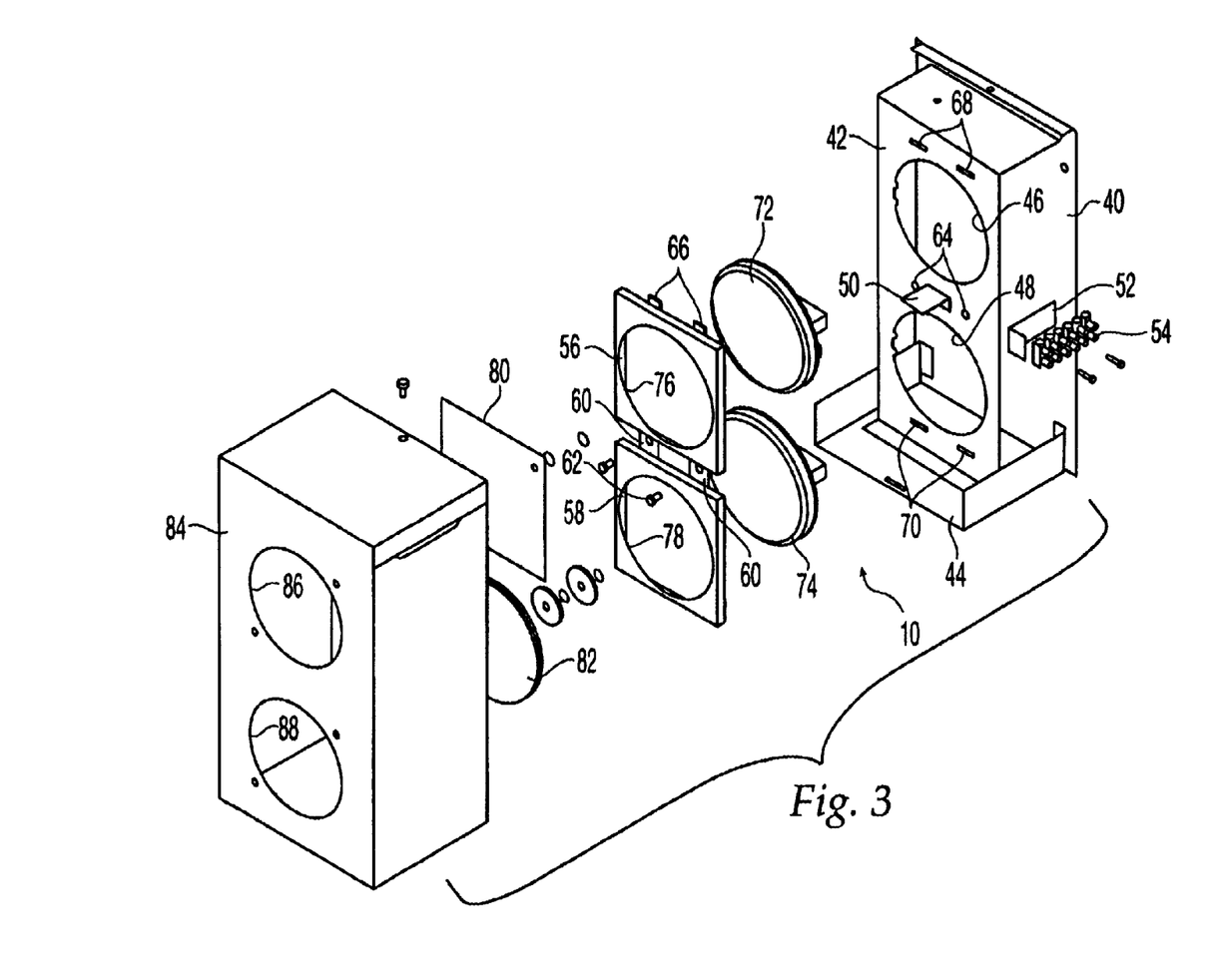
FIG. 3 is an exploded view of the exterior unit of the warning light system.

The exterior unit 10 of the dock light warning system is shown in an exploded view in FIG. 3. The exterior unit 10 is comprised of a support plate 40 adapted to be secured to the building wall and a light supporting plate 42 comprised of a substantially S-shaped metal plate secured at the top to the support plate 40 and at the bottom to a horizontal support plate 44 secured to and extending outwardly at right angles to the support plate 40. The light support plate 42 is provided with two circular apertures 46 and 48 with a light baffle 50 protruding outwardly therefrom at right angles between the two apertures 46 and 48. An L-shaped bracket 52 is adapted to be secured to the inner face of the light support plate 42 and a plurality of electrical control units 54 are adapted to be secured thereto.

A pair of lamp support brackets 56 and 58 are formed as thin boxes connected together by a pair of straps 60. Each strap is provided with a hole for the reception of screws 62, which extend therethrough into engagement with aligned holes 64 in the support plate 42. The upper edge of the box 56 is provided with a pair of upstanding tabs 66 which are adapted to extend through corresponding slots 68 in the support plate 42. A similar pair of tabs (not shown) protrude downwardly from the lower edge of the box 58 and are adapted to extend through the slots in the support plate 42. Once the tabs are inserted through the corresponding slots, they may be bent upwardly or downwardly into engagement with the inner surface of the support plate 42 to secure the boxes 56 and 58 to the support plate 42 along with the screws 62. A pair of thin profile halogen lamps are provided and are adapted to be disposed within the boxes 56 and 58. The diameter of the halogen lamps is such that the outer circumferential edges of the lamps are secured between the boxes 56 and 58 and the outer surface of the support plate 42 surrounding the apertures 46 and 48. The upper lamp 72 is a narrow, 5° beam spread 50 watt halogen lamp while the lower lamp 74 is a wide beam 50 watt halogen lamp.

A custom colored acrylic lens 80 is adapted to be secured to the outer surface of the box 56 by any suitable means over the circular opening 76. The lens 80 is a custom acrylic lens having a reddish orange color, preferably ACRILEX 2128 red. The lens 80 does not diffuse light coming from the lamp 72 and the beam of the lamp 72 retains its 5° spread. A standard green lens 82 is adapted to be secured to the box 58 over the circular opening 78. The lens 82 is used to diffuse the light from the wide beam lamp 74.

Finally, a cover 84 is provided for the entire unit in the form of a rectilinear box having a pair of circular openings 86 and 88 in the front surface thereof in alignment with the circular apertures 76 and 78 in the boxes 56 and 58 and the circular apertures 46 and 48 in the support plate 42. The cover 84 may be secured to the main support plate 40 by any suitable means such as screws or the like which allow for detachability. Thus the exterior unit 10 will have the red light disposed over the green light and the unit 10 is mounted on the building structure at a height approximately the average height of an exterior rearview mirror of a truck from the ground.

Figure 4:
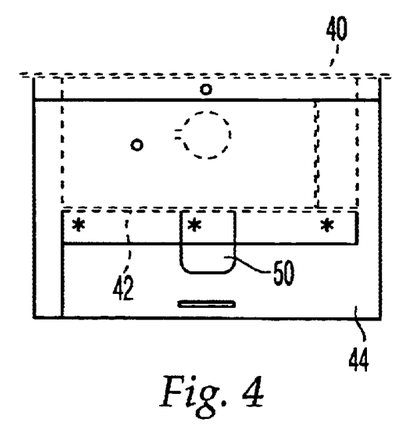
FIG. 4 is a top plan view of the exterior unit with the outer cover removed.
Figure 5:
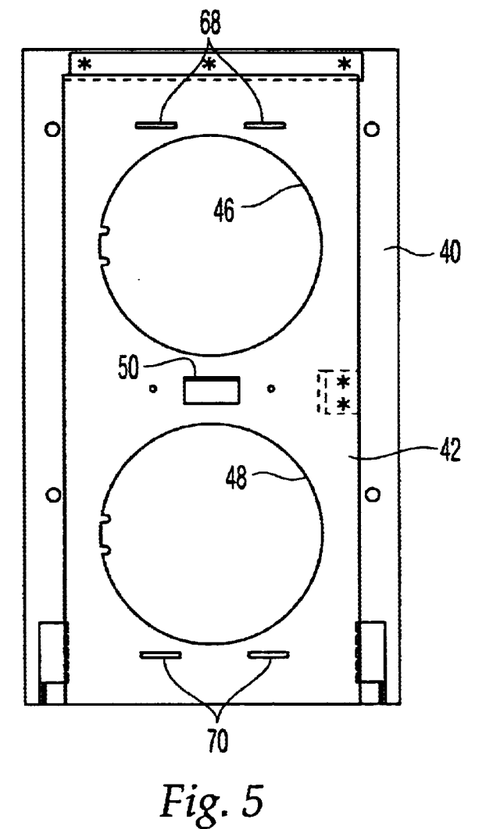
FIG. 5 is a front elevational view of the exterior unit with the front cover removed.
Figure 6:
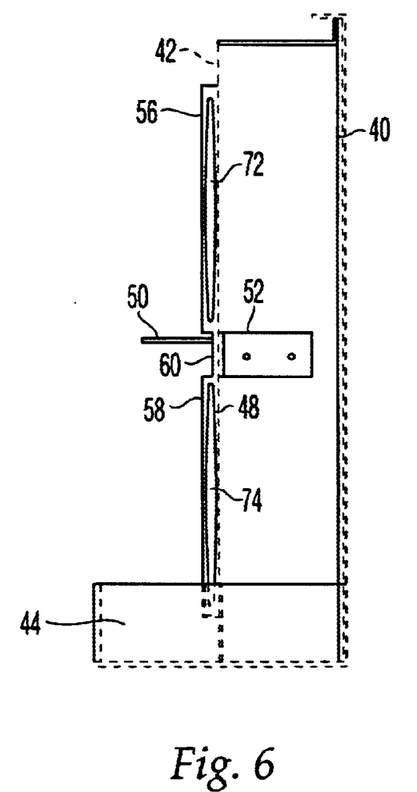
FIG. 6 is a vertical, sectional view of the exterior unit.
Figure 10:
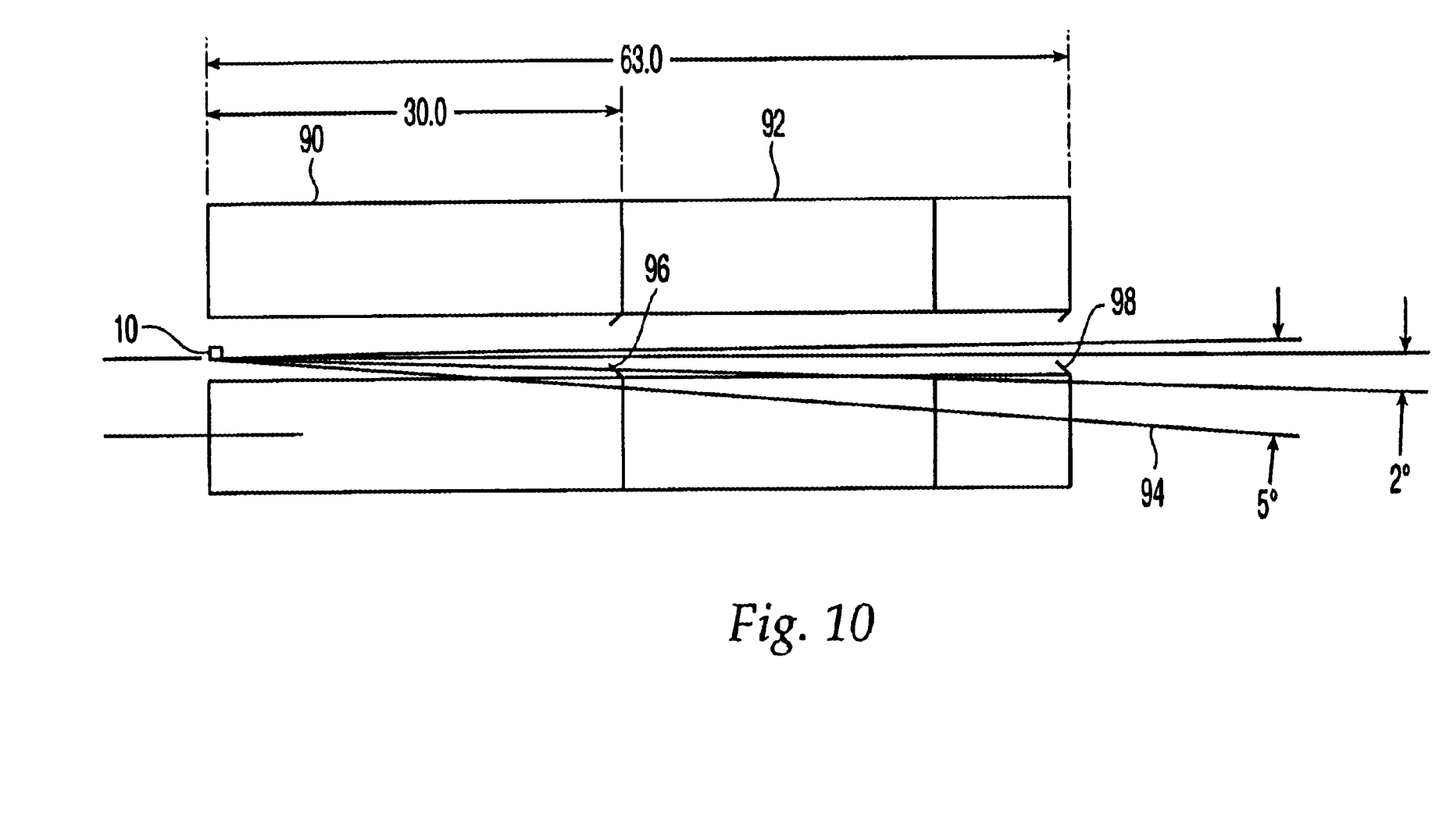
FIG. 10 is a schematic view showing the red light beam in relation to the rearview mirrors of different size trucks.

In order to focus the narrow 5° beam of red light on the driver's side exterior rearview mirror, the support plate 42 is disposed at a 2° angle relative to the main support plate 40 as best seen in FIG. 4. This is necessary in view of the fact that the exterior unit 10 is mounted to one side of the door and accordingly, will be located to one side of a truck backed up to the dock. FIG. 10 is a schematic view of a 30 foot truck 90 and a 63 foot truck 92 showing their relationship relative to the exterior unit 10 of the warning light system. The 5° light beam 94 is angled by 2 degrees due to the 2 degree angle of the support plate 42 relative to the main support plate 40 so that an outer edge of the beam 94 will be disposed substantially parallel to the side of either size truck. Thus, the center of the beam will be in substantial alignment with the outside rearview mirror 96 of the 30 foot truck 90 as well as the outside mirror 98 of the longer 63 foot truck 92. Thus, the high intensity red light beam will be focused on the driver's side outside rearview mirrors and will not provide any high intensity light on the outside passengers' side mirrors of the truck at the next loading dock position. The diffuse green beam of light, which indicates that it is safe to back up to or leave the loading dock, will not interfere with the driver's rear vision. On the other hand, the high intensity red beam of light will be reflected off the outside driver's rearview mirror into the face of the driver so that he can not possibly ignore the warning that he should not move the truck under any circumstance.

Figure 7:
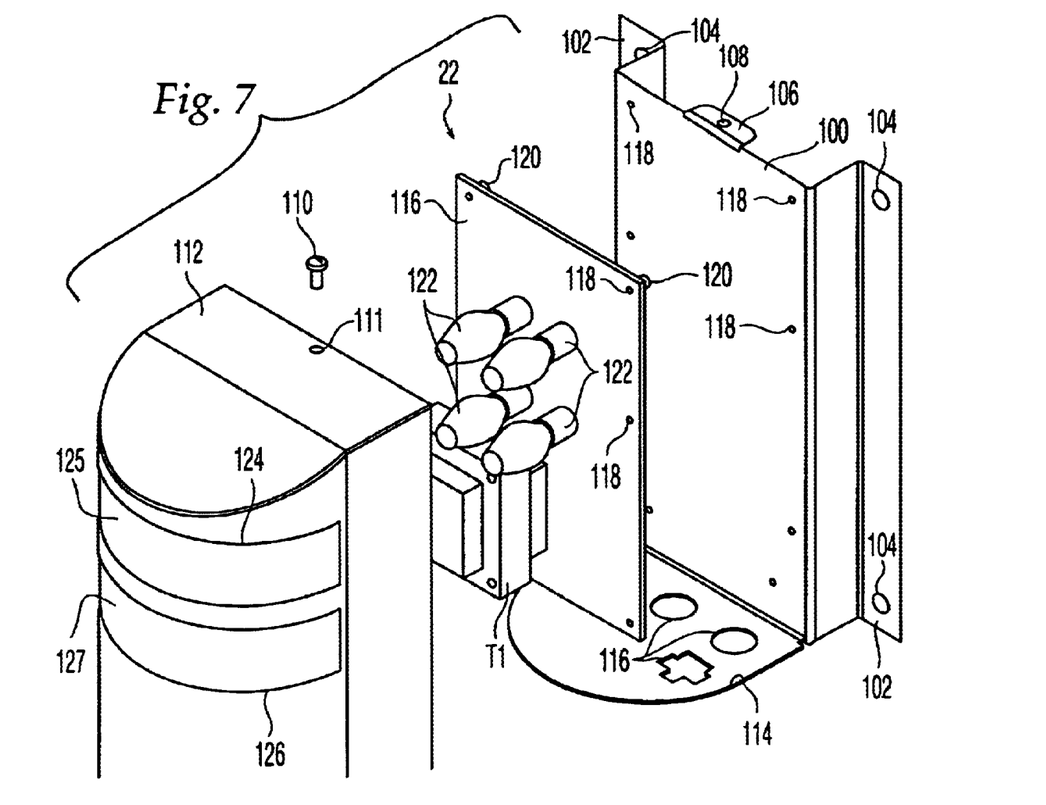
FIG. 7 is an exploded view of the interior unit of the dock light warning system.

FIG. 7 is an exploded view of the interior unit 22 of the dock light warning system. A main support bracket 100 is comprised of a substantially U-shaped sheet metal member having flanges 102 with apertures 104 for receiving mounting screws to secure the bracket 100 to the interior wall of the building structure. A tab 106 extends inwardly from the upper edge of the bracket 100 and is provided with a screw hole 108 for reception of the screw 110 which would extend through a corresponding aperture 11 in the cover 112 to secure the cover to the support bracket 100. A bottom flange 114 is integral with and extends outwardly from the bracket 100 and is provided with apertures 118 to provide for wiring access.

Figure 8:
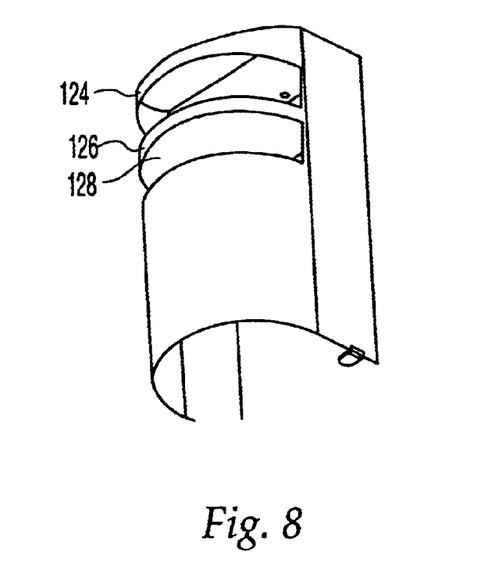
FIG. 8 is a perspective view from the bottom front of the cover for the interior unit.

A lamp support plate 116 is adapted to be secured to the bracket 100 in spaced parallel relation thereto by means of screws (not shown) extending through apertures 118 in the plate 116 and the bracket 100. The screws will also extend through spacers 120, which are located between the plate 116 of the bracket 100. Four 120 volt lamps 122 are mounted on the plate 116 along with a 12 volt transformer for the lights in the external unit. The cover 112 is provided with a semi-cylindrical profile having two windows 124 and 126 extending from one side thereof, parallel to each other. The window 124 is provided with a red lens 125 and the window 126 is provided with a green lens 127. Each of the lenses provides a 180° view so that the status of the warning system can readily be determined from many different locations within the building. As best seen in FIG. 8, a semi-circular divider plate 128 is provided between the openings 124 and 126 to provide a light baffle between the two upper lamps and the two lower lamps. When the upper lamps 122 are illuminated, a red light will emanate through the lens 125 which indicates that the red lamp of the outside unit is illuminated and the overhead door is in the open position. Likewise, when the two lower lamps 122 are illuminated, the lens 127 will provide a green light, indicating that the green light of the exterior unit is illuminated and the overhead door is closed.

Figure 9:
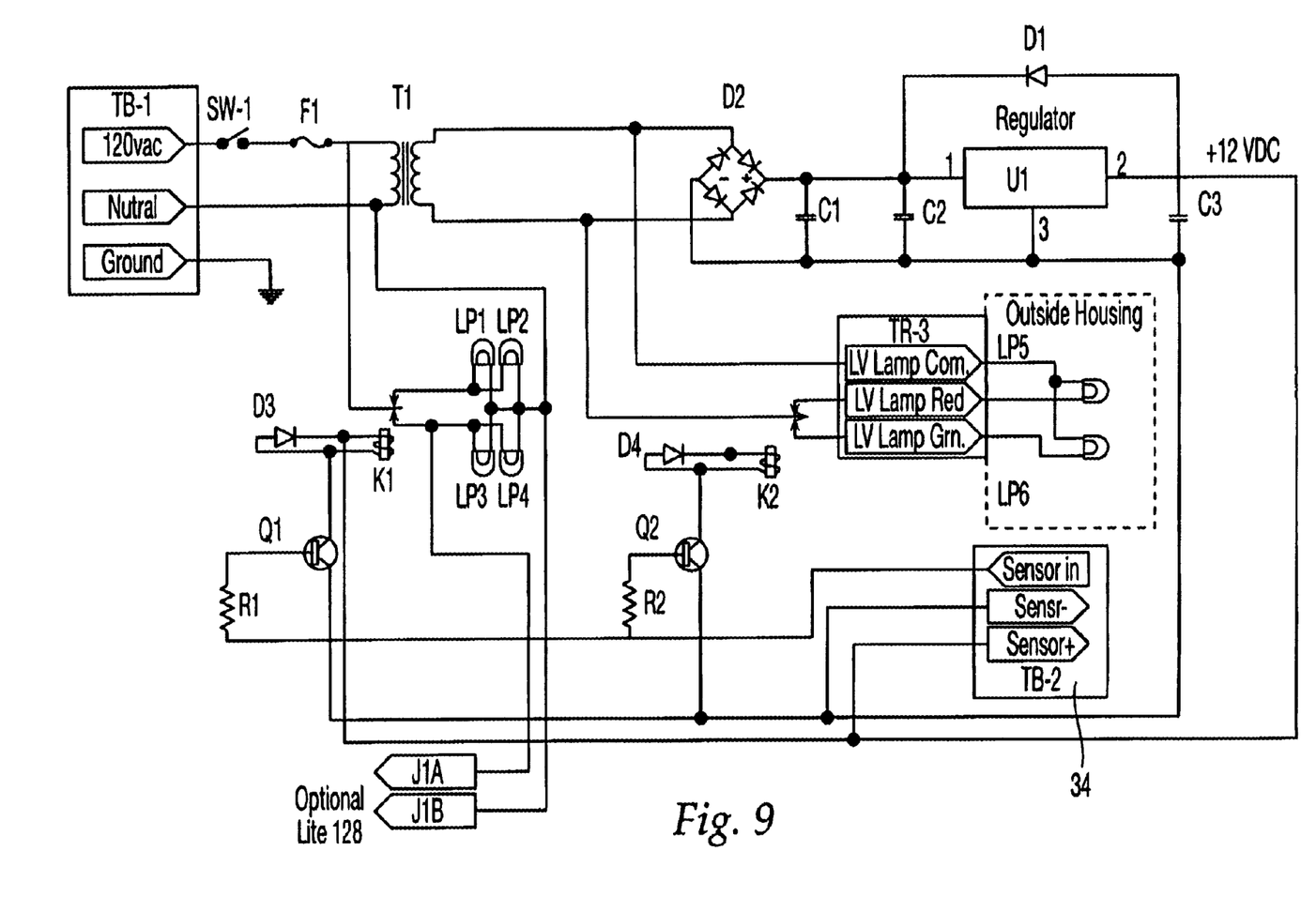
FIG. 9 is a circuit diagram for the dock light warning system.

A control circuit for the warning system is shown in FIG. 9. 120 volts is supplied from a source TB-1 to a 12 volt transformer T1 through a switch SW1 and a fuse F1. 120 vac is supplied to the lamps LP1 and LP2, which correspond with upper lamps 122 and the lamps LP3 and LP4, which correspond to the lower lamps 122 under the control of a relay D3.

The optional light may be connected to the lamps of the interior unit 22 such that the light unit 128 for lighting the interior of a truck will be energized when the overhead door 20 is in the open position. 12 vac is supplied to the outside lamps LP5 and LP6 which correspond to the lamp 72 and the lamp 74, respectively. These lamps are under the control of the relay D4. The photocell assembly 34 controls the relays D3 and D4 through the transistors Q1 and Q2, respectively. The photocell 34 is provided with 12 vdc through the rectifier D2 and the regulator. The truck light warning system described above is substantially automatic inasmuch as the system will switch from the green light to the red light in both the interior and exterior units upon opening of the overhead dock door. The dock door would only be opened when a truck is backed up to the door with the brakes set and the engine shut off. The red warning light would be highly visible to the driver, which would clearly indicate to him that the truck should not be moved while the red light is illuminated. Thus, the dock light warning system according to the present invention provides a high degree of safety to dock workers who are in the process of loading or unloading a truck.

While the invention has been particularly shown and described with reference to preferred embodiments thereof, it will be understood by those in the art that the foregoing and other changes in form and details may be made therein without departing from the spirit and scope of the invention.

What is claimed is:

1. A dock light warning system comprising a dock door opening having a dock door movably mounted for opening and closing said dock door opening, an exterior unit mounted adjacent said dock door opening, said exterior unit including a red light assembly and a green light assembly operatively associated with said dock door, and control means automatically illuminating the red light assembly upon opening of the dock door and illuminating the green light assembly upon closing of the dock door.

2. A dock light warning system according to claim 1, wherein said red light assembly provides a narrow beam of red light adapted to be focused to shine on a driver's side exterior rearview mirror of a truck parked at the dock door.

3. A dock light warning system as set forth in claim 2, wherein said narrow beam of light has a 5° beam spread.

4. A dock light warning system as set forth in claim 2, wherein said red light assembly is mounted at a 2° angle relative to the vertical plane of the dock door to focus the narrow beam of red light on the driver's side exterior rearview mirror.

5. A dock light warning system as set forth in claim 1, further comprising an interior unit adapted to be mounted adjacent the dock door opening, said interior unit including a red light assembly and a green light assembly, wherein said control means illuminates the red light assembly of the interior unit simultaneously with illumination of the red light assembly of the exterior unit and illuminates the green light assembly of the interior unit simultaneously with illumination of the green light assembly of the exterior unit.

6. A dock light warning system as set forth in claim 1, wherein said control means includes a photocell assembly for sensing opening and closing if the dock door.

* * * * *